United States Patent [19]

Chesnutt et al.

[11] Patent Number: 5,463,319

[45] Date of Patent: Oct. 31, 1995

[54] INDUCTION LOG SONDE FEEDPIPE HAVING A PLURALITY OF TUBES ARRANGED WITHIN IT AND WINDOWS TO FACILITATE THE PASSAGE OF THE CONDUCTORS

[75] Inventors: Dennis P. Chesnutt; Randal T. Beste, both of Houston, Tex.

[73] Assignee: Halliburton Energy Services, Inc., Houston, Tex.

[21] Appl. No.: 98,144

[22] Filed: Jul. 28, 1993

[51] Int. Cl.⁶ .................................................. G01V 3/18
[52] U.S. Cl. ................................................... 324/339
[58] Field of Search ........................... 324/339–343, 324/366; 340/854.3

[56] References Cited

U.S. PATENT DOCUMENTS

| | | | |
|---|---|---|---|
| 3,181,057 | 4/1965 | Bravenec | 324/339 X |
| 3,249,858 | 5/1966 | Gouilloud | 324/339 |
| 4,651,101 | 3/1987 | Barber et al. | 324/339 |
| 5,132,624 | 7/1992 | Kitson | 324/339 |

*Primary Examiner*—Sandra L. O'Shea
*Assistant Examiner*—Jay M. Patidar
*Attorney, Agent, or Firm*—Arnold White & Durkee

[57] ABSTRACT

An induction log is constructed in a sonde and has at least one or more transmitter coils and at least one or more receiver coils. The sonde supports a power supply and telemetry equipment along with transmitter and receiver apparatus for the coils. The transmitter coils require current levels as much as 1 amperes while the receive signals form output signals which are merely a fraction of a microvolt. The feedpipe array is preferably a feedpipe adapted to be centered in the axial lengthwise portion of the sonde and is further provided with a plurality of openings to enable leads for the coils to be connected. The feedpipe array is formed with a set of multiple steel tubes which are collectively assembled as a bundle on the interior of a copper sleeve.

6 Claims, 2 Drawing Sheets

INDUCTION LOG SONDE FEEDPIPE HAVING A PLURALITY OF TUBES ARRANGED WITHIN IT AND WINDOWS TO FACILITATE THE PASSAGE OF THE CONDUCTORS

BACKGROUND OF THE DISCLOSURE

An induction log device utilizes one or more coils to form fields which extend from a sonde which encloses log equipment into formation adjacent to a well borehole. As a practical matter the number of coils included in the log device has increased well above a single transmitter coil, typically guard or steering coils above and below the transmitting coil(s). Furthermore all these coils are wound on a common mandrel which comprises a part of the shell or housing of the sonde. Numerous turns are involved in each coil. The coils extend along the length of the mandrel while the ends of the coil(s) utilize small drilled holes in the supportive mandrel. The coil wires extend to the interior for connection with suitable power supplies to provide appropriate operating currents for the coils. As the depths of investigation have become greater and the number of coils has increased, the receiver signals which are required for operation of these coils have become quite small. Voltage levels measure typically in the tens of nanovolts. In view of the number of coils located on the mandrel and the fact that these coils all have a common coaxial mounting on the mandrel, there are substantial magnetic fields formed by the transmitter coils, which are concentrated in the relatively small diameter of the sonde. Indeed, the supportive mandrel is only two or three inches in diameter in most embodiments.

It is necessary to position a number of lengthwise or axial conductors along the sonde to provide current flow to and from the respective coils making up the coil array. In light of this, the current flows are very substantial in the transmitter coils and create interactive magnetic fields where the mutual inductance linking the several coils and the coil leads becomes very substantial.

SUMMARY OF THE INVENTION

The present apparatus is directed to a sonde construction which reduces this interplay. More specifically, it is a sonde construction which suppresses coupling from coil lead to coil-lead. It helps isolate their leads from the mutual inductance linking the coils and leads together. Furthermore, it enables the coil leads to be assembled as a unit. When they are assembled as a unit, they are more neatly organized on the interior of the sonde and have substantially reduced interwire coupling.

In addition to the transmitter coils requiring large currents that are formed during the transmission sequence, there are a number of receiver coils which require leads positioned on the interior of the sonde. Receiver signal voltages are very small. They typically measure in the range of just a fraction of a microvolt, sometimes measuring in the tens of nanovolts. They also must be routed along the length of the sonde on the interior. It is very difficult therefore to position these receiver leads adjacent to parallel conductors which carry currents of approximately 1 ampere on the one hand while the receiver leads deliver an output signal of only 10 or 20 nanovolts on the other hand. As will be understood, this raises the risk or difficulty of false signals which are formed in the receiver leads from the transmission coils coupling into the receiver leads.

The present apparatus is a construction of several conduits and pipes which are positioned as a bundle on the interior of the sonde so that the induction logging system operates in the intended fashion. Moreover, the present system utilizes the pipes or conduits on the interior in accordance with this disclosure to provide isolation. Cross-talk is substantially reduced. In addition to that, the length of the present apparatus enables appropriate location of the electronic equipment along the sonde at spaced locations along the length of the sonde. For that, one must not over look the fact that the sonde is an elongate cylindrical structure enclosing a number of components which must be distributed along the length of the sonde and which must also communicate from one end to the other. For that reason, the present apparatus enables better communications.

This apparatus is summarized as a sonde construction featuring a copper wrapped internal conduit in the structure. It is constructed so that the conduit surrounds a number of smaller internal conduits. Preferably, they are formed of steel and have the form of small hollow tubular members for receiving coil lead wires. The length substantially matches that of the sonde, and the conduit is constructed so that ingress or egress can be achieved at selected points. Where it is necessary to bring a wire into or out of the copper conduit, a window is formed with a milling device in the tube thereby defining a port of modest dimensions. The wire is placed in that port, and the port is subsequently closed, preferably being closed with a copper plate so that the port does not serve as a leak for electromagnetic radiation. Steel tubes isolate individual wires in the bundle as depicted in the figures, in one preferred embodiment, the feedpipe sheath is a polygonal structure with the minimum sides of the sheath being defined by the plurality of tubes in the feedpipe assembly.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
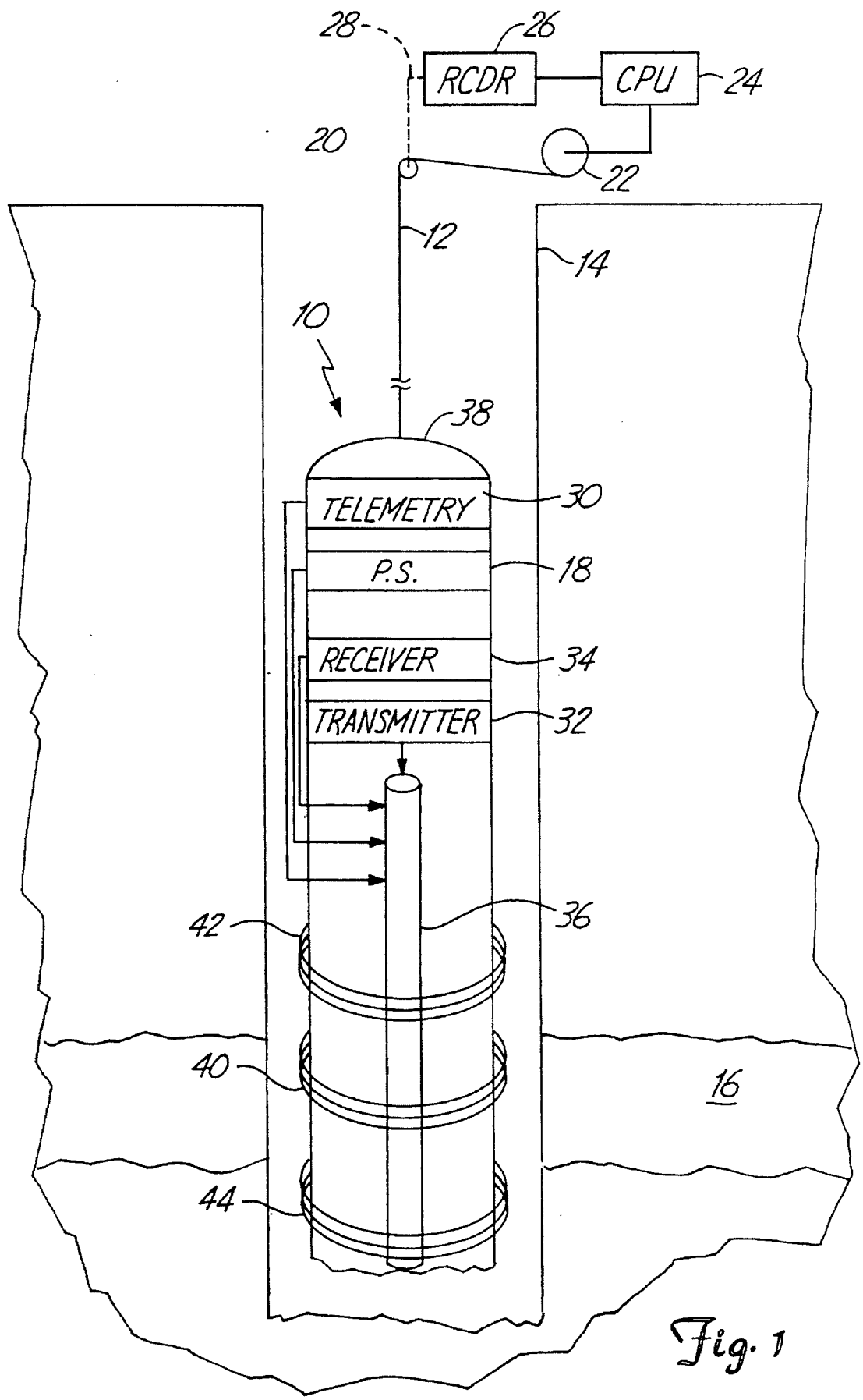
FIG. 1 is a view of the induction logging sonde supported in a well borehole for making measurements in formations adjacent to the well borehole utilizing transmitter and receiver coils supported on the sonde.

Attention is now directed to FIG. 1 of the drawings where an induction logging sonde 10 is lowered into a well borehole on a wire line 12. The wire line 12 extends from the sonde 10 to position it in the well borehole 14 at a given depth and measurements are made of formations 16 adjacent to the well borehole. This typically is run in an open or uncased well. That is, no casing is placed in this region so that fields can be extended from the sonde into the formations adjacent to the sonde. Resistivity measurements are made in accordance with procedures believed to be well known utilizing a number of coils which are placed on the sonde. The coils are numerous, and typically require very substantial currents. To this end, a very substantial power supply 18 is incorporated in the structure. The sonde supports the power supply 18 which furnishes power for the various coils. In addition, the coils cooperate with the formation so that the interplay between the formations and the coils is reflected by the received voltages detected by the receiver coils on the sonde. Again this is a procedure which is believed to be well known and understood in the art.

The wire line 12 extends to the surface and passes over a sheave 20 at the surface. The length of the wire line is spooled on a drum or reel 22 at the surface. The wire line 12 incorporates one or more electrical conductors which are connected to equipment at the surface. The surface located equipment includes a CPU 24 which provides an output signal indicative of formation resistance (or the inverse of it which is conductivity). The CPU 24 also connects with a surface located recorder 26. The recorder 26 is provided with the depth of the sonde in the well borehole. That depth is determined by an electrical or mechanical depth measuring apparatus 28 which is connected from the sheave to the recorder.

Also, it may be necessary, and is probably expedient, to route the telemetry signals into and out of the protective cable apparatus that will be explained in some detail hereinafter. Suffice it to say, the apparatus includes a telemetry system 30 which connects through one or more conductors in the logging cable to thereby enable the logging cable to extend to the CPU and thereby provide the resistivity measurements to the CPU 24. The data is recorded as a function of depth by the recorder 26. The induction logging system of the present disclosure further includes a transmitter 32 which provides a suitable shaped current pulse or flow to a transmitter coil. The system also includes a receiver 34 which is provided with the received signal from receiver coils.

In FIG. 1 of the drawings, the sonde has been shown with a portion broken away so that the apparatus of the present invention can be positioned on the interior and yet illustrated. The present invention particularly features a feedpipe 36 which is centered on the interior of the housing, which is a sealed structure for enclosing the various components. The feedpipe 36 has a diameter which is relatively small, sufficiently small such that the electronomagnetic fields internal to the coils are not significantly effected. In the sonde, the electronics are located along the sonde housing at a distance from the coils. The transmitter and receiver coils are grouped at one location or area while the various electronic components 18, 30, 32 and 34 are relatively remote. This electronic component deployment is well known. .These components must all be located within the shell or housing 38. As will be understood to those of average skill in this art, the housing is a leak proof, pressure resistant housing which is capable of being exposed to extremely high pressures and temperatures in deep wells. It encloses the electronic components which are indicated in symbolic form in FIG. 1 of the drawings. Moreover, these components are distributed along the length of the shell or housing 38. On the interior of the coil array, the feedpipe of the present disclosure is situated, preferably coaxial with the shell or housing 38, and extending substantially the full length of the structure.

The housing serves as a support structure which encloses a mandrel (omitted for sake of clarity) which supports the coils. The coils are formed of multiple turns of wire. As a generalization, they are wound on a mandrel which is positioned just on the interior of the shell or housing 38. The supportive mandrel locates the turns of wire just below or internally of the shell 38 so that the coils are protected against rough handling. They are covered over by the shell. Typically, this requires that the shell be formed of a material which is transparent to the fields which are formed by the coils during operation. The feedpipe 36 is thus shown axially of the structure. It is centered with respect to the shell 38, and the shell is represented as a coil form providing shape or definition to the turns of the coils. In a representative fashion, the numeral 40 indicates a transmitter coil while the coil 42 is a guard coil which aids and assists in shaping the outwardly directed radiation from the coils. A receiver coil 44 is represented also. While only three coils have been shown, a typical device will include a greater number of coils, and they are spaced in a controlled pattern which enables operation of the system so that a magnetic field is formed in the formations immediately adjacent to the well borehole. The magnetic field is included for the express purpose of forming any currents which are induced in the formations and which provide a reply signal. As a generalization, the current required for the transmitter coil 40 can be 1 ampere. The guard coil can require 1 ampere current for its operation also. The receiver coil typically detects small signals and provides an output which is typically a fraction of a microvolt. These representative measures give some idea of the relative scale of current flows which might be encountered.

Figure 3:
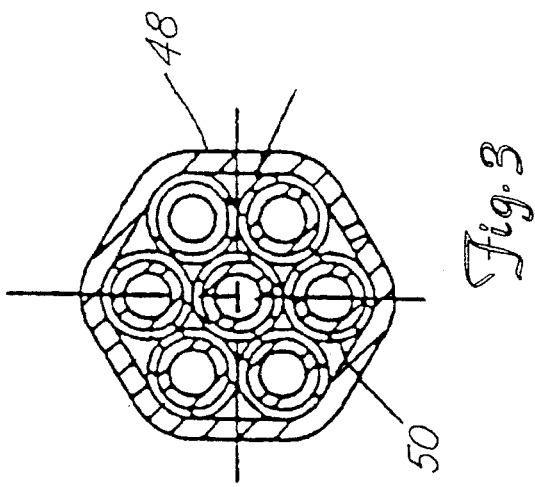
FIG. 3 is a sectional view of the feedpipe shown in FIG. 2 showing in cross section the construction which holds and supports several different electrical conductors.
Figure 2:
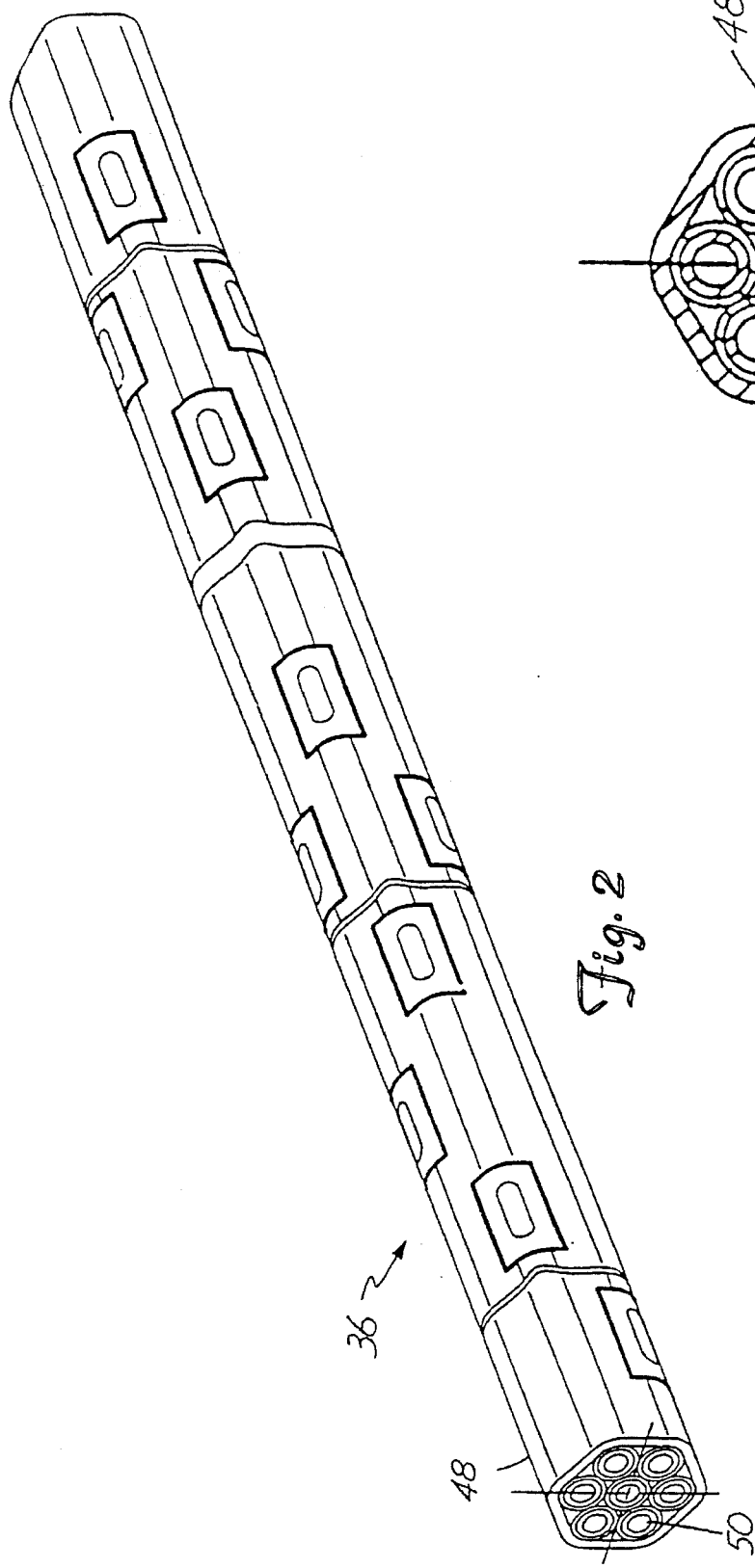
FIG. 2 is an enlarged view of a feedpipe array which extends on the interior of the sonde shown in FIG. 1.

The feedpipe is shown in FIG. 2 of the drawings. It is preferably provided with an external copper jacket 48 which surrounds one or more small tubes 50. The tubes 50 are included on the interior. They are preferably formed with a common diameter. As illustrated, one can be placed in the center while six can be positioned around the exterior, thereby defining seven individual conductor paths. The conductor paths are all similar in construction. The conductor paths differ only in their relative position in the bundle. As better shown in the sectional view of FIG. 3 of the drawings, an individual conductor can be readily located in the steel tubing 50. Steel tubing is preferably formed of metal on the exterior and has an internal coating of exaggerated thickness as shown in the drawings. Alternately, a sleeve of insulated material can be formed and positioned in the tubing, but the preferred form of insulation is obtained by placing the insulated coating on the interior of the steel tubing. Accordingly, similar steel tubes are shown in FIG. 3, and they are arranged with six steel tubes positioned as evenly spaced around the central tube. The central tube is similar to the others except for the difference in position. The many tubes included in the drawings serve as a feedpipe mechanism. The several tubes are captured on the interior of the copper sleeve 48. The sleeve 48 is preferably made snug or tight so that the tubes do not slip. This holds the bundle of seven individual steel tubes in a fixed relationship to each other and also to the surrounding sleeve 48. As mentioned, the individual tubes are preferably formed of steel while the surrounding sleeve 48 is formed of copper. Steel is a relatively good shield to magnetic radiation. Magnetic fields do not couple readily through the steel. This protects the conductors placed on the interior of the steel tubes. Moreover, the copper sheath on the exterior is a very good conductor. It is preferably connected to the sonde ground. In addition, the sheath 48 extends the full length of the structure so that it holds the entire bundle together and defines a structure which can be readily assembled into the sonde each tube will completely surround, from a lateral perspective, the conductor or conductors extending therethrough. Thus, each tube provides magnetic shielding of the conductor(s) therein from all sides.

Figure 4:
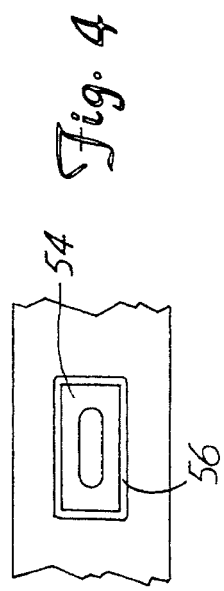
FIG. 4 is a detailed view of a single window or port formed in the feedpipe which is constructed to hold down magnetic leakage through the port.

It is necessary to get conductors into and out of the feedpipe array 36 shown in FIG. 2 of the drawings. Individual holes are formed in it. Through the use of a milling tool which features a rotating cutter, a rectangular window is formed at the appropriate location along the length of the copper sheath 48. The cut is made sufficiently deep that the cutting head will cut entirely through the external sheath 48 and will also cut into the exposed wall of the steel tube at that location. The size of the cut is controlled so that only one steel tube is penetrated; this enables a rectangular window to be formed in a steel tube to permit ingress or egress for electrical conductors. One or more conductors can pass into or out of the steel tube at such a location. The cuts are relatively long, perhaps in the vicinity of an inch or so. When the appropriate wires have been placed in the respective steel tubes, the cuts which define the relatively large windows can be repaired. It is desirable that the cuts be repaired by positioning an insert 54 in the cut windows at 56, referring to FIG. 4 of the drawings. The window is preferably formed of copper and has a length and width which matches the size of a port or opening. Moreover, when the cut is made the cut enables access to be obtained to the tube adjacent to the cut window. This permits the access for cable termination through the cut window. The window is then reduced in size by inserting a copper plate in the window, and soldering the copper plate around the periphery as shown in FIG. 4 of the drawings. Ideally, silver solder is used to accomplish this connection. A small opening is left in the plate so that the necessary electrical conductors extend into or out of the window though relatively smaller holes. The replacement windows shown in FIG. 4 is used at every appropriate location so that one or two conductors can be brought out of or into the feedpipe array 36.

Returning now to FIG. 1 of the drawings, the feedpipe array enables the conductors or leads for the different coils to be connected in the appropriate circuitry. The receiver coil 42 must be connected with receiver circuit 34. The receiver coil must, of necessity, provide relatively small current flows which are transmitted to the receiver circuitry 34. By contrast, the current flow to the transmitter 40 can be very substantial, even as much as 1 ampere.

The feedpipe array of FIG. 2 enables the necessary current levels to be sustained for operation of the transmitter coil and the suitable guard coils with it. While this occurs at that part of the equipment, the receiver signal is a fraction of a microvolt, perhaps just tens of nanovolts. This apparatus enables that to be received with a minimum of feed conductor cross talk.

As will be appreciated, the relative difference in the signal levels makes it relatively easy for cross talk to occur. Since this is highly undesirable, a better quality receive signal can be obtained though the use of the feedpipe of the present disclosure.

While the foregoing is directed to the preferred embodiment, the scope thereof is determined by the claims which follow:

We claim:

1. An induction log system, comprising:
   an elongated sonde assembly including transmitter and receiver coils and transmitter and receiver circuits to enable induction measurements of formation resistivity, said sonde assembly further including a housing assembly;
   an elongated feedpipe assembly located within said sonde housing assembly, said feedpipe assembly comprising:
      an outer generally tubular member formed of a highly electrically conductive material;
      a plurality of conductors extending through said outer tubular member, said conductors arranged in selected groups in said outer tubular member; and
      a plurality of tubes formed of a second material, said second material providing substantial shielding of magnetic fields, said plurality of tubes arranged within said outer member to form a tube assembly having a generally close fit within said outer member, said conductor groups extending through said tubes, each said tube completely laterally surrounding the conductor extending therethrough to provide magnetic shielding of said conductor from all sides.

2. The induction log system of claim 1, wherein said feedpipe outer member comprises a plurality of windows to facilitate the passage of said conductors from a location interior to said outer member to a location exterior to said outer member.

3. The induction log system of claim 2, wherein each said window also penetrates a selected tube.

4. The induction log system of claim 1, wherein said outer generally tubular member is formed of copper.

5. The induction log system of claim 1, wherein said tubes are formed of steel.

6. The induction log system of claim 1, wherein each of said tubes being lined with an insulating material.

* * * * *